US012715561B2

(12) United States Patent
Loefler et al.

(10) Patent No.: US 12,715,561 B2
(45) Date of Patent: Aug. 25, 2026

(54) SYSTEMS FOR CLEANING UNDERWATER STRUCTURES

(71) Applicant: Hullbot Pty Ltd, Rozelle (AU)

(72) Inventors: Thomas Loefler, Rozelle (AU); Karl Watfern, Rozelle (AU)

(73) Assignee: HULLBOT PTY LTD, Rozelle (AU)

( * ) Notice: Subject to any disclaimer, the term of this patent is extended or adjusted under 35 U.S.C. 154(b) by 719 days.

(21) Appl. No.: 17/634,025

(22) PCT Filed: Aug. 7, 2020

(86) PCT No.: PCT/AU2020/050815
§ 371 (c)(1),
(2) Date: Feb. 9, 2022

(87) PCT Pub. No.: WO2021/026589
PCT Pub. Date: Feb. 18, 2021

(65) Prior Publication Data
US 2022/0324543 A1 Oct. 13, 2022

(30) Foreign Application Priority Data
Aug. 9, 2019 (AU) ................................ 2019902870

(51) Int. Cl.
*B63B 59/08* (2006.01)
*B08B 1/32* (2024.01)
(Continued)

(52) U.S. Cl.
CPC ................ *B63B 59/08* (2013.01); *B08B 1/32* (2024.01); *B63G 8/001* (2013.01); *B63G 8/38* (2013.01); *B63G 8/39* (2013.01); *G05D 1/0206* (2013.01)

(58) Field of Classification Search
None
See application file for complete search history.

(56) References Cited

U.S. PATENT DOCUMENTS 10,315,740 B2 * 6/2019 Ferguson ............... B63G 8/001
2007/0276552 A1 * 11/2007 Rodocker ............. B62D 57/00 701/2
(Continued)

FOREIGN PATENT DOCUMENTS

GB 2528871 A 2/2016
KR 20160007140 A 1/2016
(Continued)

OTHER PUBLICATIONS

Extended European Search Report mailed Oct. 17, 2022 in EP Applicaiton No. 20852789.5.
(Continued)

*Primary Examiner* — Hitesh Patel
*Assistant Examiner* — Wenyuan Yang
(74) *Attorney, Agent, or Firm* — MARSHALL, GERSTEIN & BORUN LLP

(57) ABSTRACT

A system for cleaning a structure arranged in a body of water. The system includes: a vehicle operable to move through the water and clean the structure; a tether connectable between the vehicle and a fixed position; a deployment mechanism securable relative to the structure and configured to move the vehicle into, and out of, the water; and a processing unit configured to communicate with the vehicle and the deployment mechanism. The processing unit is configured to execute a repeating cleaning schedule to cause the deployment mechanism to operate to move the vehicle into the water, the vehicle to operate to clean at least a portion of the structure, and the mechanism to operate to remove the vehicle from the water.

13 Claims, 8 Drawing Sheets

(51) Int. Cl.

| | |
|---|---|
| ***B63G 8/00*** | (2006.01) |
| ***B63G 8/38*** | (2006.01) |
| ***B63G 8/39*** | (2006.01) |
| ***G05D 1/00*** | (2024.01) |

(56) References Cited

U.S. PATENT DOCUMENTS

| | | | | |
|---|---|---|---|---|
| 2009/0173677 | A1 | 7/2009 | Seura | |
| 2011/0282536 | A1 | 11/2011 | Rooney, III | |
| 2012/0006352 | A1 | 1/2012 | Holappa et al. | |
| 2013/0263770 | A1* | 10/2013 | Andersen | B63G 8/26 114/330 |
| 2013/0298817 | A1* | 11/2013 | Holappa | B08B 1/30 114/222 |
| 2014/0230711 | A1* | 8/2014 | Lovelace | B60B 19/006 180/9.1 |
| 2018/0073266 | A1* | 3/2018 | Goldenberg | E04H 4/1654 |
| 2019/0216211 | A1 | 7/2019 | Swain et al. | |
| 2019/0380547 | A1* | 12/2019 | Turpin | A47L 5/14 |
| 2020/0249690 | A1* | 8/2020 | Regev | G05D 1/0246 |
| 2022/0194532 | A1* | 6/2022 | Oftedahl | G05D 1/0055 |

FOREIGN PATENT DOCUMENTS

| | | | | |
|---|---|---|---|---|
| KR | 20160027586 | A * | 3/2016 | B25J 11/0085 |
| KR | 20170065916 | A | 6/2017 | |
| WO | 2013154426 | A1 | 10/2013 | |

OTHER PUBLICATIONS

International Search Report and Written Opinion, mailed Oct. 21, 2020, in PCT Application No. PCT/AU2020/050815.

* cited by examiner

SYSTEMS FOR CLEANING UNDERWATER STRUCTURES

CROSS-REFERENCE TO RELATED APPLICATIONS

This application is a National Phase of PCT Application No. PCT/AU2020/050815, filed Aug. 7, 2020, which claims the benefit of AU application No. 2019902870, filed Aug. 9, 2019, the disclosures of each of which are hereby incorporated by reference in their entireties.

TECHNICAL FIELD

The present disclosure relates, generally, to systems for cleaning underwater structures and, in particular, relates to systems for removing fouling from the hull of a vessel.

BACKGROUND

Structures which are submerged in a body of water, such as a lake, river or ocean, develop fouling over time. Fouling is due to the accumulation of live organisms (biofouling) or non-live substances attaching to surfaces of the structure. If left unattended, fouling degrades the surfaces causing irreversible damage and potentially resulting in mechanical failure of the structure.

Fouling of a vessel's hull is a significant problem as degradation of hull surfaces increase friction between the hull and water. This increases fuel consumed by the vessel during transit, frequency of hull maintenance, and likelihood of mechanical failure of the hull. Proper management of hull fouling involves periodic removal of the fouling (hull cleaning). This often involves removing the vessel from the water, requiring lifting apparatus such as a crane, or a dry dock, to allow manual removal of fouling with tools and/or pressurised water cleaners. Alternatively, vessel hulls are cleaned in-situ by persons diving underwater to manually clean the hull. Both approaches are time consuming, potentially dangerous, restricted by environmental regulation and expensive, particularly where removal of the vessel from the water is required.

Various automated, or semi-automated, systems for cleaning the hulls of vessels, generally intended for cleaning commercial vessels, are known. The majority of such systems are based on 'crawling' across the hull to remove fouling, where a cleaner device is pressed against the hull, typically by a suction or similar mechanism, and operated to remove fouling with brushes and/or jets of pressurised water. For example, the "SCAMP®" vehicle, produced by Seaward Marine Services LLC, has an array of brushes surrounding high pressure water jets which are operable to remove fouling, and a central impeller which drives the vehicle against the hull. When in contact with the hull, the vehicle is manually guided across the hull by a diver. The vehicle is large-scale, requiring a crane to deploy and recover it from the water.

When operating optimally this system, and similar systems, can be effective at removing fouling. However maintaining continuous optimal operation is often not achievable. For example, such systems can be unreliable at maintaining contact with the hull, meaning that the cleaning vehicle requires frequent guidance to restore contact with the hull, proving inefficient to operate. Furthermore, the complexity, size and cost of such systems mean that these are generally impractical and/or cost prohibitive for use by private vessel owners.

Any discussion of documents, acts, materials, devices, articles or the like which has been included in the present specification is not to be taken as an admission that any or all of these matters were common general knowledge in the field relevant to the present disclosure as it existed before the priority date of each of the appended claims.

SUMMARY

According to at least one disclosed embodiment, there is provided a system for cleaning a structure submerged in a body of water. The system includes: a vehicle operable to move through the water and clean the structure; a tether connectable between the vehicle and a fixed position; a deployment mechanism securable relative to the structure and configured to move the vehicle into, and out of, the water; and a processing unit configured to communicate with each of the vehicle and the deployment mechanism. The processing unit is configured to execute a repeating cleaning schedule which defines a cycle period. Responsive to the cycle period elapsing, the processing unit executes the schedule to: communicate with the deployment mechanism to cause the mechanism to operate to move the vehicle into the water; communicate with the vehicle to cause the vehicle to operate to clean at least a portion of the structure; and communicate with the deployment mechanism to cause the mechanism to operate to remove the vehicle from the water.

The processing unit may be configured to adjust the cycle period responsive to assessing one or more factors relating to at least one of the structure and an environment local to the structure.

The processing unit may be configured to compare the one or more factors with corresponding historical one or more factors, and wherein responsive to the processing unit determining a difference between the one or more factors and the historical one or more factors, the processing unit is configured to adjust the cycle period.

The processing unit may be configured to adjust the cycle period responsive to determining a location of the structure.

The processing unit may be configured to adjust the cycle period responsive to determining the current date and/or time.

The processing unit may be configured to receive a meteorological data feed, and be configured to adjust the cycle period responsive to assessing meteorological data relating to the location of the structure.

The system may also include one or more motion sensors arranged to detect motion of at least one of the water and the structure, and the processing unit be configured to communicate with the one or more motion sensors and adjust the cycle period responsive to receiving sensed motion information from the one or more motion sensors.

The vehicle may include one or more sensors configured to detect a fouling condition of the structure, and the processing unit be configured to adjust the cycle period responsive to receiving sensed fouling condition information from the vehicle.

The processing unit may be configured to adjust the cycle period responsive to determining a geometry of the structure. In this embodiment, the vehicle may include one or more sensors configured to detect spatial information, and determining the geometry involve the processing unit assessing sensed spatial information.

The system may also include a garage configured to at least partially receive and enclose the vehicle, and the deployment mechanism be operable to move the vehicle into, and out of, the garage.

The tether may be secured between the vehicle and the deployment mechanism, and the deployment mechanism may include a windlass drivingly engaged with a motor such that operation of the motor adjusts an effective length of the tether.

The processing unit may be housed within the garage.

According to other disclosed embodiments there is provided a vehicle for cleaning an underwater structure. The vehicle comprises: a body defining a notional plane and a peripheral region; and a plurality of cleaning elements, each cleaning element being rotatable about an axis extending outwardly from the peripheral region and arranged at an obtuse angle relative to the notional plane.

Each cleaning element may define a contact surface configured for cleaning the structure, and the contact surface intersect the notional plane. In this embodiment, the contact surface may be conical.

The contact surface may at least partially be defined by a plurality of limbs extending away from the associated axis. The limbs may be at least partially deformable.

The body may define a recess, and a pair of the cleaning elements flank the recess such that the respective pair of contact surfaces extend substantially across the recess.

The peripheral region may be rectangular, and one of the axes extend outwardly from each corner of the peripheral region.

The body may house a plurality of thrusters operable to move the vehicle freely in three-dimensional space underwater.

Throughout this specification the word “comprise”, or variations such as “comprises” or “comprising”, will be understood to imply the inclusion of a stated element, integer or step, or group of elements, integers or steps, but not the exclusion of any other element, integer or step, or group of elements, integers or steps.

It will be appreciated embodiments may comprise steps, features and/or integers disclosed herein or indicated in the specification of this application individually or collectively, and any and all combinations of two or more of said steps or features.

BRIEF DESCRIPTION OF DRAWINGS

Embodiments will now be described by way of example only with reference to the accompanying drawings in which.

DESCRIPTION OF EMBODIMENTS

Figure 1:
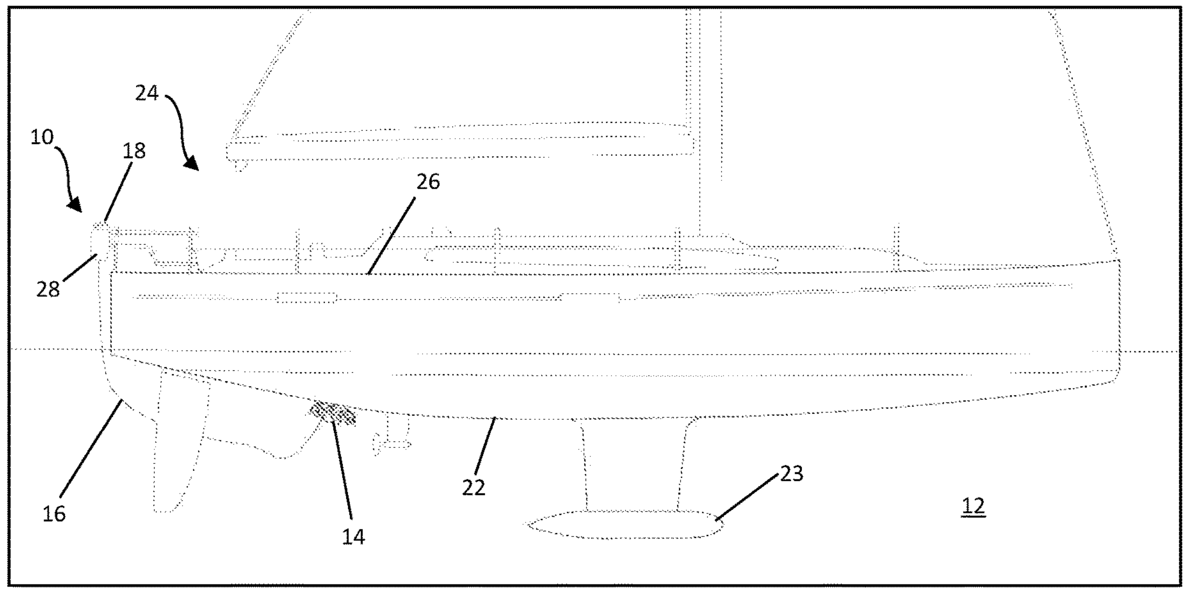
FIG. 1 is a side view of a system for cleaning underwater structures secured to a ship and being operated to clean the hull of the ship.

In the drawings, reference numeral 10 generally designates a system 10 for cleaning a structure arranged in a body of water 12. The system 10 includes: a vehicle 14 operable to move through the water 12 and clean the structure; a tether 16 connectable between the vehicle 14 and a fixed position; a deployment mechanism 18 securable relative to the structure and configured to move the vehicle 14 into, and out of, the water 12; and a processing unit 20 configured to communicate with each of the vehicle 14 and the deployment mechanism 18. The processing unit 20 is configured to execute a repeating cleaning schedule defining a cycle period, whereby, responsive to the cycle period elapsing, the processing unit executes the schedule to: communicate with the deployment mechanism 18 to cause the mechanism 18 to operate to move the vehicle 14 into the water 12; communicate with the vehicle 14 to cause the vehicle 14 to operate to clean at least a portion of the structure; and communicate with the deployment mechanism 18 to cause the mechanism 18 to operate to remove the vehicle 14 from the water.

Figure 2:
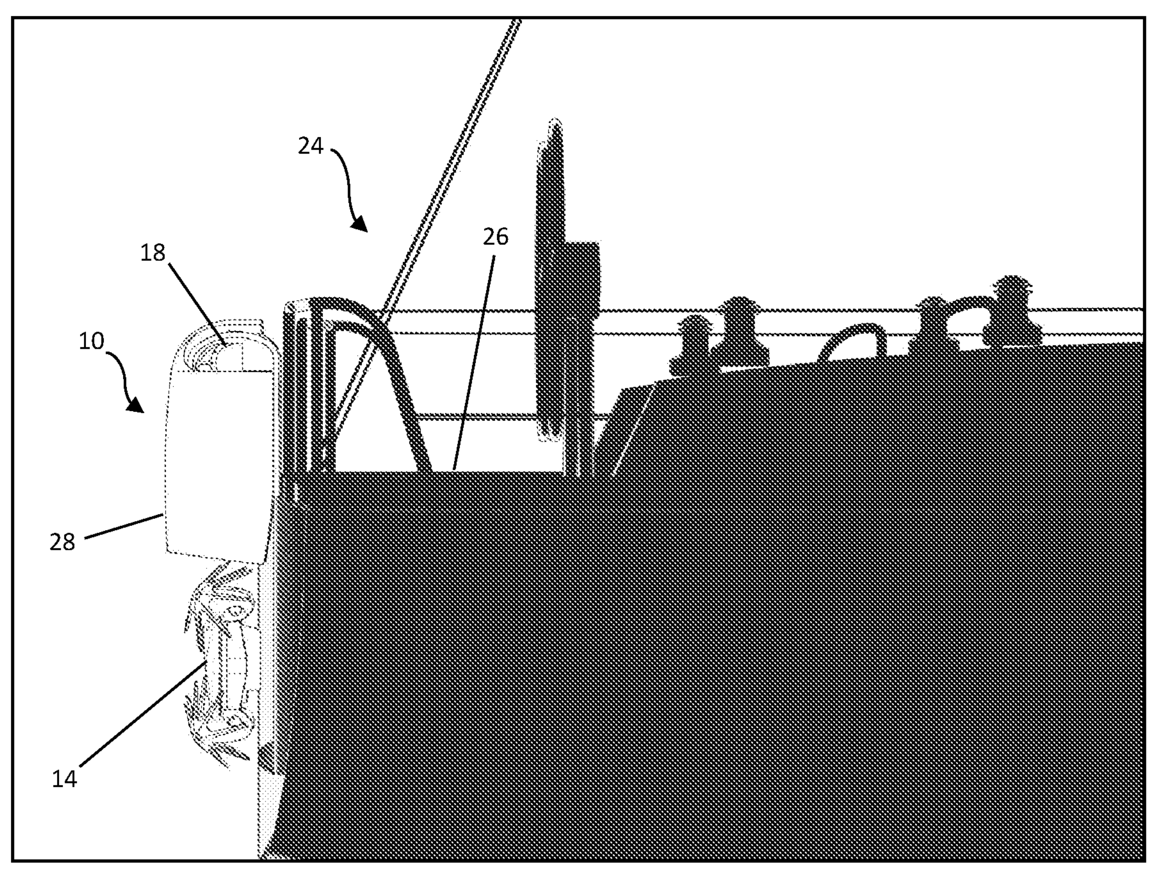
FIG. 2 is an alternative side view of the system shown in FIG. 1 in a non-cleaning state.
Figure 3:
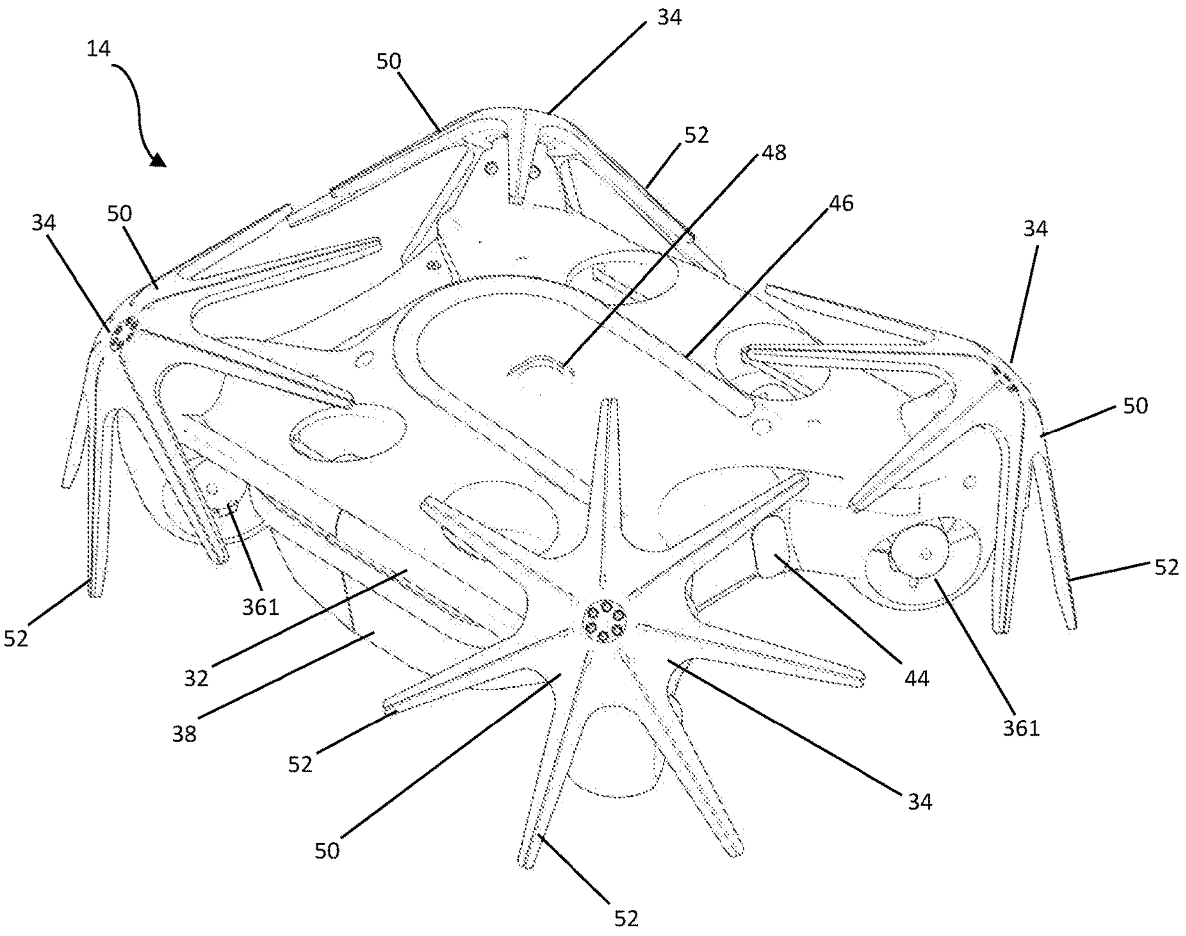
FIG. 3 is a perspective view of a cleaner vehicle which is part of the system shown in the previous figures.

FIGS. 1 and 2 show the system 10 installed in a fixed position relative to a structure, in the illustrated example in the form of a vessel 24, and being operated in two operational modes: FIG. 1 illustrating the system 10 during a cleaning mode where the vehicle 14 is deployed in the water 12; and FIG. 2 illustrating the system 10 during a rest mode where the vehicle 14 is removed from the water 12. The system 10 is configured to automatically cycle between these modes to effect regular, typically frequent, cleaning of the vessel 24.

It will be appreciated that the system 10 may be supplied in kit form comprising at least the vehicle 10, tether 16 and deployment mechanism 18 as separate components which are assembled together to allow installation or positioning relative to an underwater structure which the system 10 is operated to clean. The processing unit may be supplied as part of the kit, such as embodied in a computing device, or may be hosted remotely, as discussed in greater detail below.

The system 10 is shown secured adjacent a deck 26 of the vessel 24 to allow lowering the vehicle 14 into the water 12 to clean a hull 22 of the vessel 24 and other associated underwater structures, such as a keel 23, propellers (not shown), chains (not shown), and the like. It will be appreciated that this is one illustrative example of installation of the system 10 to clean an underwater structure and that, in other embodiments, the system 10 is securable to other structures to enable cleaning of the hull 22 or an alternative underwater structure. For example, the system 10 may be secured to part of a dock, such as a jetty (not shown), to allow cleaning of the hull 22. Similarly, the system 10 may be secured to a static structure, such as an oil platform (not illustrated), to allow cleaning of piers supporting the platform.

In the illustrated embodiments, the deployment mechanism 18 is secured to a garage 28 which is, in turn, mounted to the vessel 24. Best shown in FIG. 10, the garage 28 defines an internal volume dimensioned to at least partially receive and cover the vehicle 14 when removed from the water 12 by the mechanism 18. It will be appreciated that, in other embodiments, the deployment mechanism 18 may be directly fixed to the vessel 24, or other mounting structure, and the garage 28 be absent.

The system 10 is connected to a power supply, such as a mains connection or a battery. In the illustrated embodiments, the garage 28 is connected to at least one of a battery (not shown) and photovoltaic (PV) solar panel (not shown) on-board the vessel 24. In other embodiments (not shown), the garage 28 includes an integrated battery and/or PV module.

The tether 16 is configured to provide a mechanical connection between the vehicle 14 and the fixed position, in the illustrated embodiments, being at the deployment mechanism 18, and also provide an electrical connection between the vehicle 14 and the power supply. The deployment mechanism 18 is operable to deploy and recover the vehicle 14 from the water 12 by adjusting an effective length of the tether 16. The mechanism 18 also operates to reduce slack in the tether 16 whilst the vehicle 14 is moving through the water around the vessel 24.

The processing unit 20 is typically arranged in a sealed container 30 defined by or secured to the garage 28. The processing unit 20 is operatively connected to a communications module, typically being a wireless cellular network module, to allow communicating with a remote server via the Internet. Communicating with the remote server allows, for example, uploading data recorded by the vehicle 14 and/or the garage 28 to enable monitoring of the system 10 and/or analysis of the data, downloading software updates, operational instructions, and the like, and enables remote control of the system 10 by a user, for example, to effect maintenance or resolve an error. The processing unit 20 is communicatively connected to the vehicle 14 by the tether 16, and communicatively connected to the deployment mechanism 18 via wired or wireless connection. The processing unit 20 is configured to cause operation of the vehicle 14 and the deployment mechanism 18 according to the repeating cleaning schedule.

In other embodiments (not shown), the processing unit 20 is arranged in the vehicle 14 and communicatively connected to the communications module arranged above-water, typically being in the garage 28. In further embodiments, each of the vehicle 14 and the garage 28 house processing units 20 to allow distributed computing, such as to determine and execute the cleaning schedule. Similarly, computing may be performed by a remote server and communicated to the system 10 via the Internet.

FIGS. 3 to 6 illustrate a first embodiment of the vehicle 14. The vehicle 14 includes a body 32 defining a notional plane and a peripheral region, and a plurality of cleaning elements 34. Each cleaning element 34 is rotatable about an axis extending outwardly from the peripheral region and arranged at an obtuse angle relative to the notional plane. Typically, the cleaning elements 34 are operated as counter-rotating pairs whereby adjacent cleaning elements 34 rotate in alternative directions.

Figure 5:
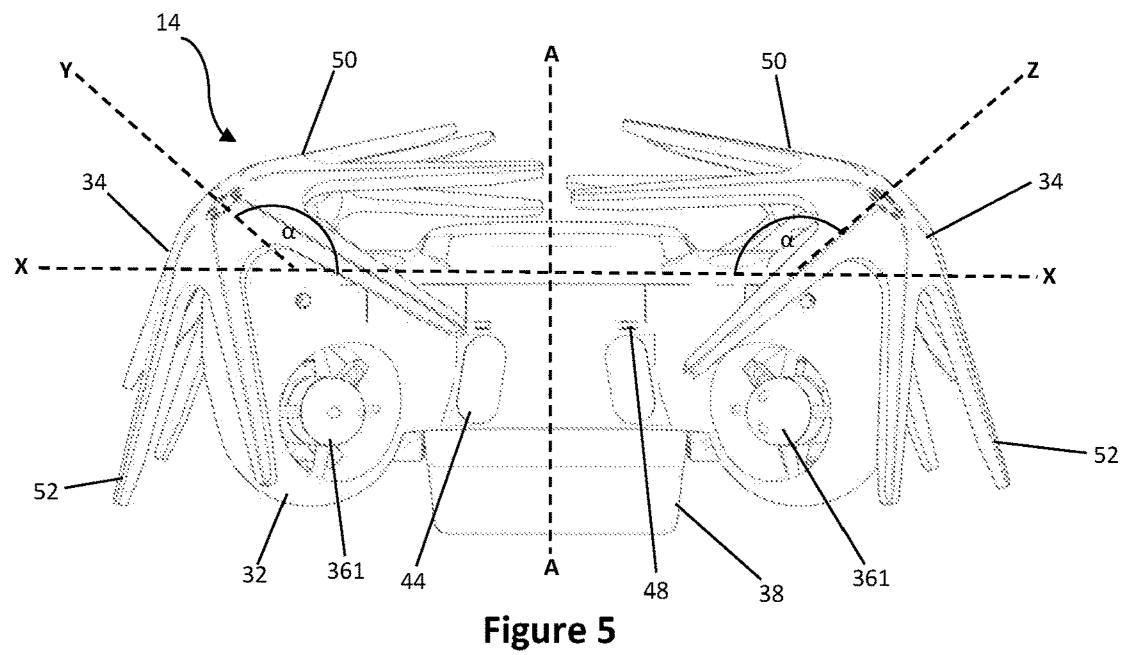
FIG. 5 is a front view of the vehicle shown in FIG. 3.
Figure 6:
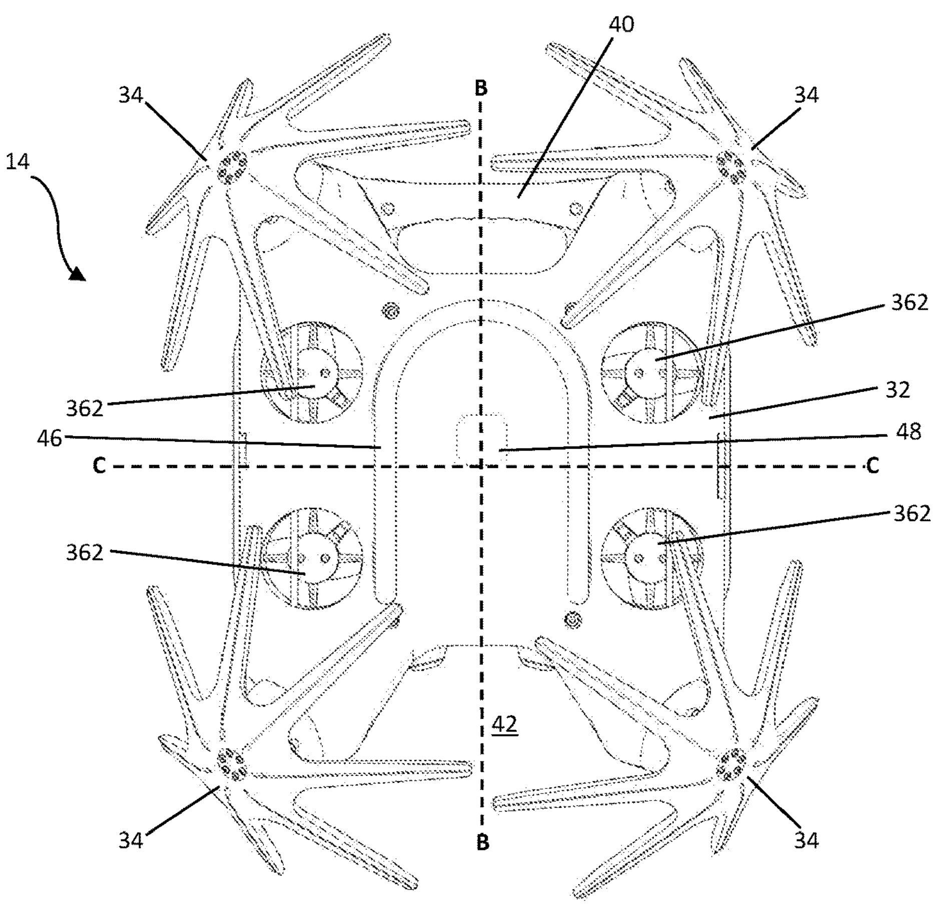
FIG. 6 is a top view of the vehicle shown in FIG. 3.

The notional plane is defined by the body 32 to extend through the body 32 substantially parallel to a top surface of the body 32. FIG. 5 illustrates an exemplary notional plane defined along line X-X. This figure also illustrates rotational axes Y, Z of two of the cleaning elements 34. Each axis Y, Z extends outwardly from a periphery of the body 32 at an obtuse angle $\alpha$ relative to the plane X-X. Best shown in FIG. 6, in the illustrated embodiments the periphery of the body 32 is rectangular and the axes of the cleaning elements 34 extend outwardly from the corners of the rectangle.

Rotating the cleaning elements 34 about axes arranged in this way allows the cleaning elements 34 to extend around all sides and the top of the body 32. This arrangement of the cleaning elements 34 optimises surface area of each cleaning element 34 available to clean the structure. This means that the vehicle 14 is operable to clean the structure by urging any side of the vehicle 14, apart from the underside, against the structure and rotating the cleaning elements 34. This also allows the vehicle 14 to generally be maintained level, that is the plane X-X is maintained substantially parallel to the water's 12 surface, to enhance controlling movement of the vehicle 14.

The body 32 defines ducts which house eight thrusters 361, 362 rotatable by electric motors (not illustrated). The ducts are arranged such that operation of the thrusters 361, 362 enables moving the vehicle 14 freely in three-dimensional space through the water 12.

Four of the ducts position some of the thrusters 361 about the periphery of the body 32 to allow rotation of the body 32 about a pitch axis C and roll axis B (FIG. 6) and translate the body 32 in a forwards, reverse and sideways direction. The other four ducts position the other thrusters 362 to allow rotation of the body about a yaw axis A (FIG. 5) and translate the body along the axis A to adjust depth.

A sealed container 38 is releasably secured to the body 32. The container 38 houses electronic components including a range of sensors, including any of ultrasound sensors, a barometer, infrared time-of-flight sensors, optical cameras, hall effect sensors, temperature sensors, force sensors operatively connected to the cleaning elements 34 and tether 16, and inertial measurement units (IMUs). The processing unit is configured to communicate with any of these sensors to allow receiving sensed information.

The body 32 is dimensioned to be small-scale and sufficiently lightweight to be man-portable. A handle 40 is defined at one side of the body 32 to assist manual transport of the vehicle 14 when out of the water 12.

A recess 42 is defined by the body 32 between two cleaning elements 34. The recess 42 is arranged to receive a portion of the structure being cleaned, typically being a non-planar, complex shaped portion such as a chain or propeller, to allow one or both of the flanking cleaning elements 34 to brush against the portion. The recess 42 is arranged and shaped such that the flanking cleaning elements 34 extend substantially across the recess 42.

Lighting elements 44, 46 are secured to the body 32. First lighting elements 44 are arranged to illuminate in front of the body 32. Second lighting element 46 is arranged to illuminate above the body 32. It will be appreciated that in other embodiments (not shown), further lighting elements may be included to illuminate the sides, rear and underside of the body 32.

Cameras 48 are associated with the lighting elements 44, 46 to allow video footage to be recorded underwater. Recorded footage is analysed by the processing unit 20 and/or a remote server to control navigating the vehicle 14, as described in greater detail below.

Each cleaning element 34 defines a contact surface 50 arranged to be urged against the structure and rotated about the associated axis to clean the structure. In the illustrated embodiments, the contact surface 50 is conical and arranged to intersect the notional plane. This enhances the ability of the vehicle 14 to clean the structure when arranged at the sides and above the vehicle 14. In the embodiment shown in FIGS. 3 to 6, the contact surface 50 is smooth to minimise abrasion of the hull 22. The surface 50 is configured to remove light, non-established fouling, typically being biofouling.

Each cleaning element 34 includes a plurality of limbs 52 extending radially away from the associated axis. Each limb 52 is at least partially resiliently deformable to allow flexing when rotated against a structure, thereby at least partially conforming to the structure. Typically, each limb 52 is formed from a resilient material, such as silicone or polyurethane. In other embodiments (not shown), each cleaning element 34 includes webs extending between tips of the limbs 52 to limit relative movement of the limbs 52.

Figure 4:
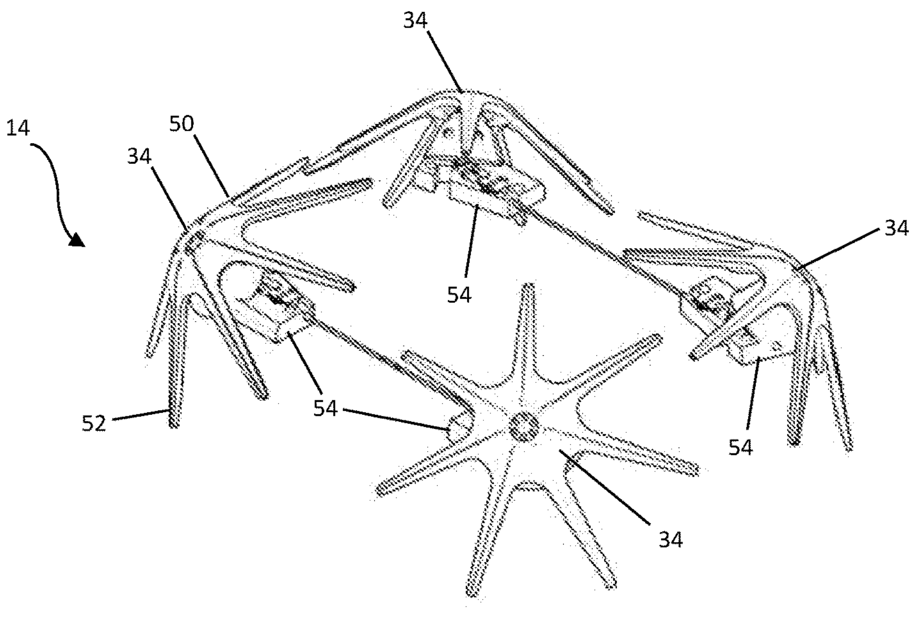
FIG. 4 is an exploded perspective view of the vehicle shown in FIG. 3.
Figure 4:
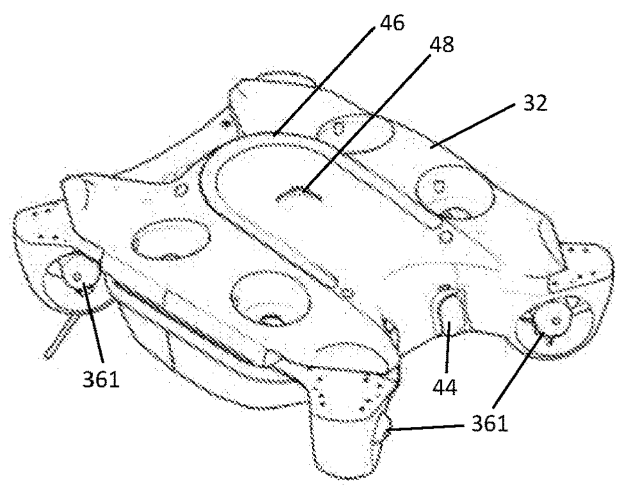
Figure 4:
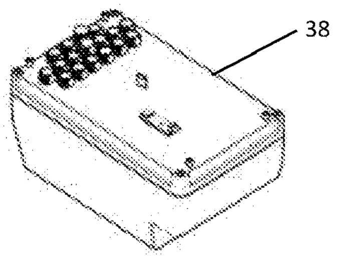

Best shown in FIG. 4, the cleaning elements 34 are driven about the axes by motors arranged in housings 54 shaped to be received by the body 32 and be arranged so that the axes extend outwardly from the periphery of the body 32.

Figure 7:
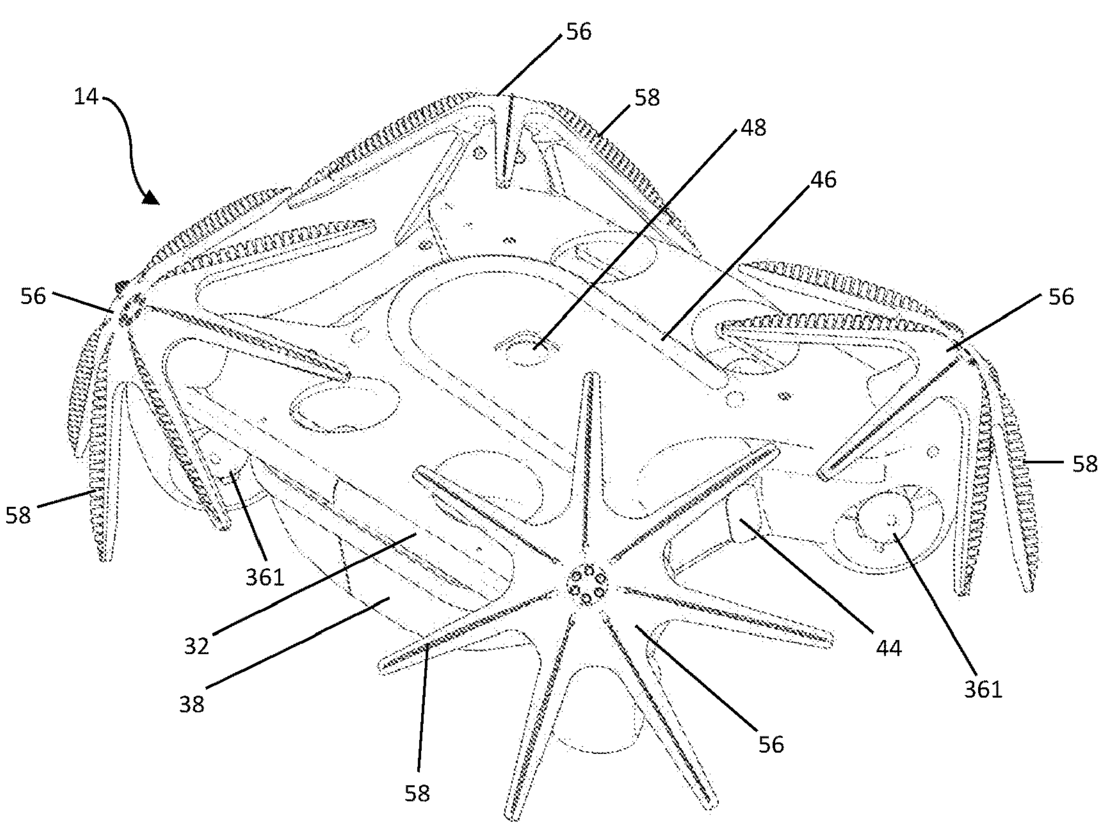
FIGS. 7 and 8 are perspective and front views, respectively of the cleaner vehicle shown in FIGS. 3 to 6 attached to alternative cleaning elements.
Figure 8:
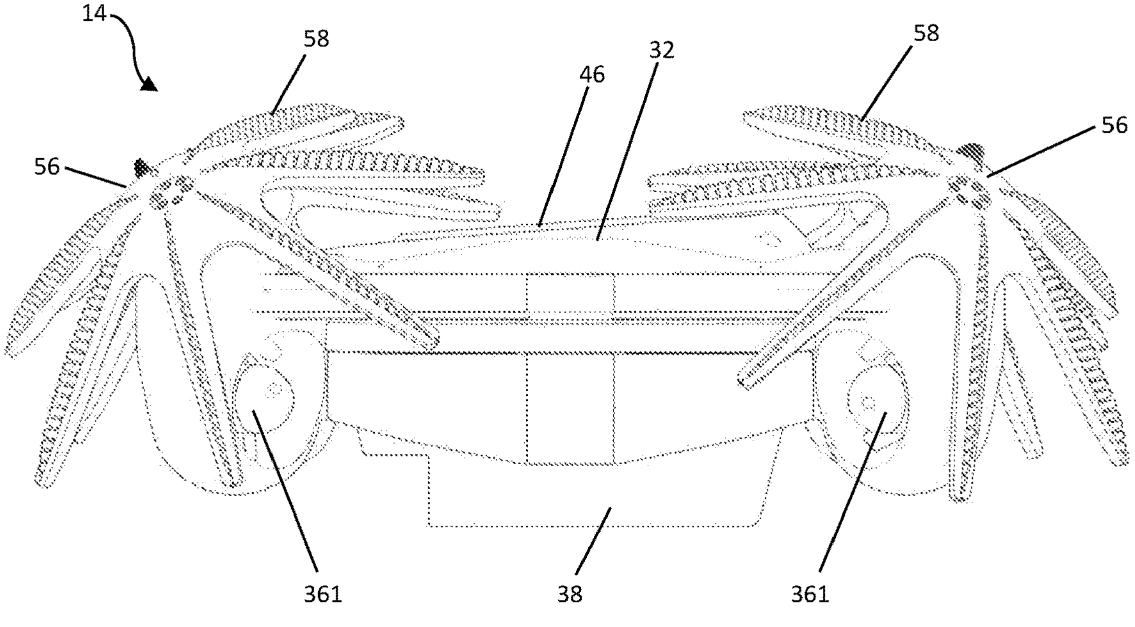

FIGS. 7 and 8 illustrate the vehicle 14 having alternative cleaning elements 56 secured about the axes extending from its periphery. The cleaning elements 56 are similarly configured to the previously described cleaning elements 34, whereby common reference numerals indicate common features.

Each cleaning element 56 includes a linear array of tines 58 extending along a spine of each limb 52. The tines 58 are resiliently deformable. The tines 58 enhance abrasion when brushed against a surface, meaning that the cleaning elements 56 can be used to remove established fouling. It will be appreciated that other cleaning element embodiments are within the scope of this disclosure and that the illustrated cleaning elements 34, 56 are merely examples.

Figure 9:
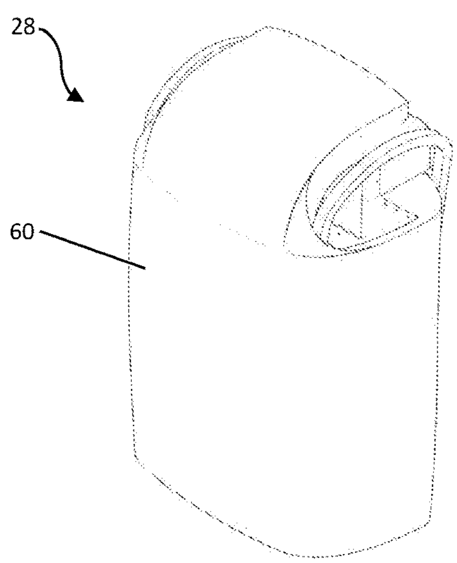
FIG. 9 is a perspective view of a garage for storing the vehicle shown in any of FIGS. 3 to 8, and which is part of the system shown in FIGS. 1 and 2.
Figure 10:
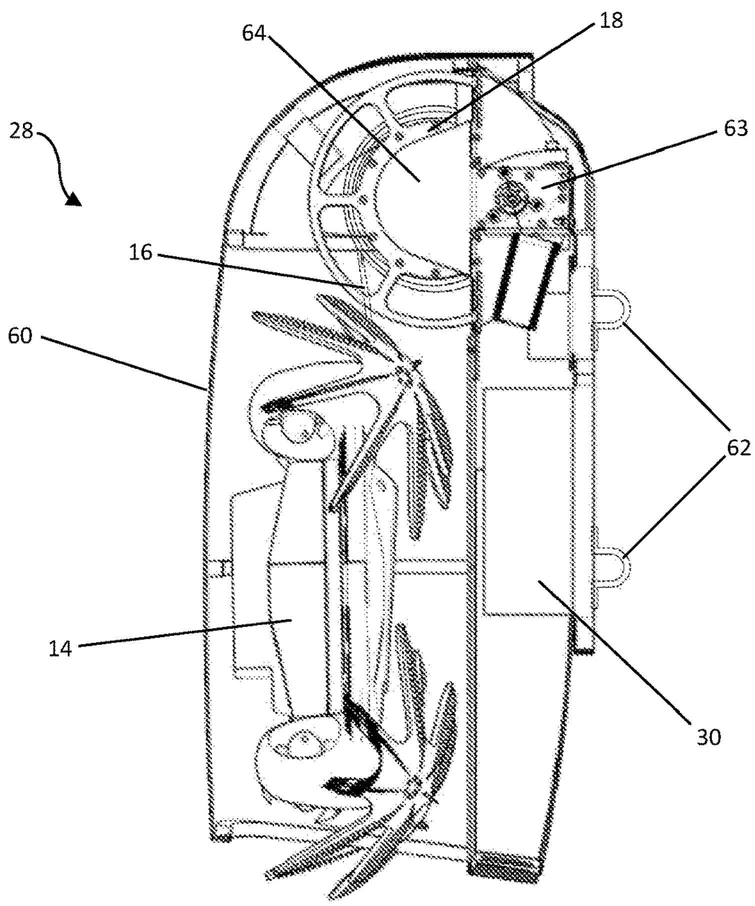
FIG. 10 is a cross-sectional view of the garage shown in the previous figure housing the vehicle shown in FIG. 3.

FIGS. 9 and 10 illustrate the garage 28 in greater detail. The garage 28 includes a cover 60 arranged to substantially enclose the internal volume. The cover 60 defines an opening at a lower edge to allow the vehicle 14 to be received within the garage 28 by passing into and out of the internal volume. Mounting brackets 62 configured to secure the garage 28 to the vessel 24, in the illustrated embodiment configured to mount to side-rails, are arranged at a rear of the garage 28. In some embodiments (not shown), the garage 28 includes a cleaning and/or sterilisation system to clean the cleaning elements 34, such as brushes and/or jets arranged to clean the cleaning elements 34, and/or UVC LEDs arranged to illuminate the cleaning elements 34.

The container 30 is configurable to house a potentially wide range of electronic components, typically including any of: a location module, such as a satellite navigation module operable to GPS, GLONASS and/or Galileo requirements; temperature module; one or more optical cameras; batteries and a battery management system; power supply and switching circuitry; maximum power point tracking (MPPT); solar system strain gauges; and a barometer.

Best shown in FIG. 10, the deployment mechanism 18 includes a motor 63 drivingly engaged with a windlass 64 which is connected to the tether 16. Operation of the motor 63 allows adjusting an effective length of the tether 16 by spooling the tether 16 from the windlass 64.

In other embodiments (not shown), the deployment mechanism 18 includes an alternative lifting mechanism securable relative to the structure being cleaned and operable to lift the vehicle 14 out of the water 12, such as a crane secured to the vessel 24 or adjacent dock structure, a fork-lift mechanism, or an elevating platform. Such embodiments are configurable to be operable independently of the tether 16 or any tether adjustment mechanism.

Figure 11:
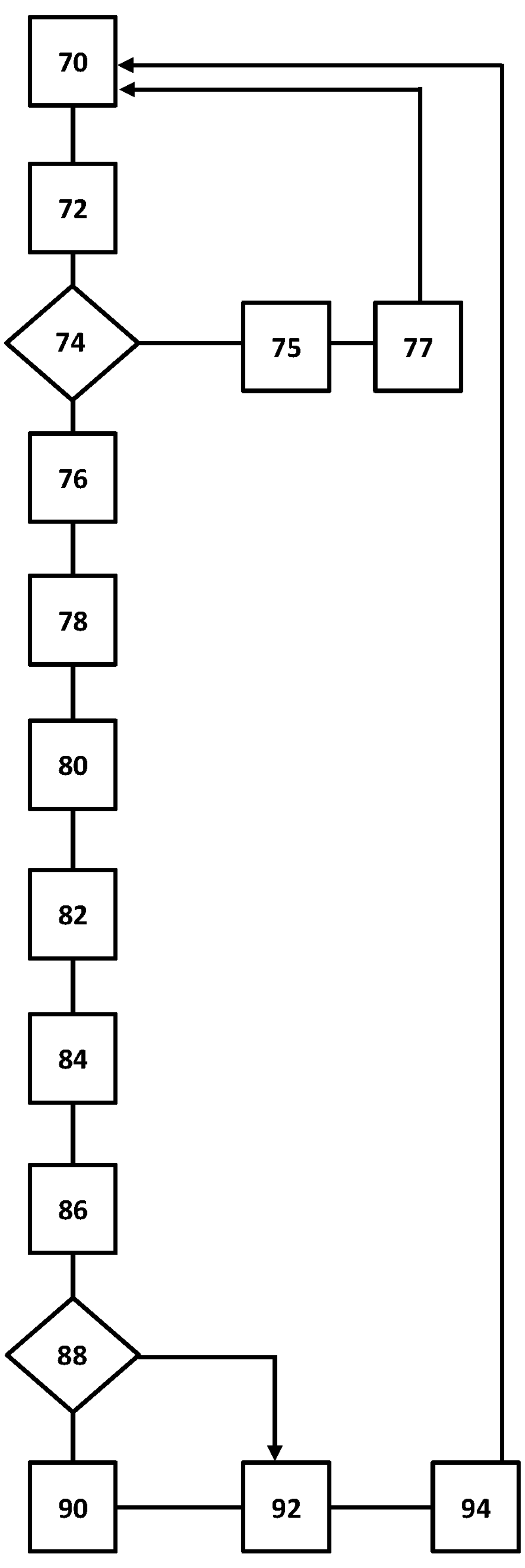
FIG. 11 is a flow-chart illustrating stages of operation of the system shown in FIGS. 1 and 2.

FIG. 11 is a flow chart illustrating stages of operation of the system 10. The stages are described with reference to the use scenario illustrated in FIGS. 1 and 2.

At stage 70, the processing unit 20 initiates execution of the cleaning schedule.

At stage 72, the processing unit 20 assesses one or more environmental factors and/or vehicular factors to allow, at stage 74, the processing unit 20 to determine whether to operate the deployment mechanism 18 to deploy the vehicle 14 into the water 12. If the processing unit 20 determines 'yes', this is actioned at stage 76. If the processing unit 20 determines 'no', a reset timer is started, at stage 75, and, at stage 77, when the timer elapses, the processing unit 20 returns to stage 70 to re-initiate the schedule.

Determining whether to deploy the vehicle 14, at stage 74, typically involves determining if any assessed factor falls outside of an approved range, such as below or above a defined threshold. Factors assessed may include: determining if meteorological information relating to the location of the vehicle 14 falls within a 'safe' range; determining if motion of the water 12 and/or the vessel 24 is below a defined threshold; determining if an object is below the vehicle 14 which would block its entry to the water 12; and determining if battery charge powering the system 10 is above a threshold.

At stage 76, the processing unit 20 communicates with the deployment mechanism 18 to cause the mechanism 18 to operate to deploy the vehicle 14 into the water 12. In the illustrated embodiments, this involves the mechanism 18 operating the windlass 64 to increase the effective length of the tether 16 to lower the vehicle 14 out of the garage 28.

At stage 78, the processing unit 20 communicates with the vehicle 14 to cause the vehicle to operate the thrusters 36 to move the vehicle through the water 12 to be spaced from the vessel 24, and operate the cameras 48 to record video footage. The processing unit 20 then assesses the footage and, optionally, refers to a database of hull geometries, typically stored at a remote memory store accessed through the Internet, to determine geometry of the hull 22, typically involving defining a three-dimensional model of the hull 22, and identify a position of the vehicle 14 relative to the hull 22. Responsive to determining the hull 22 geometry, the processing unit 20 executes a mapping process to define cleaning paths, being motion vectors, to drive the vehicle 14 along to clean the hull 22. Optionally, this also involves defining waypoints, being specific positions relative to the hull 22, which the vehicle 14 can be driven to if the vehicle 14 departs from a cleaning path. This then allows navigation of the vehicle 14 to be adjusted to cause the vehicle 14 to return to the cleaning paths.

At stage 80, the processing unit 20 communicates with the vehicle 14 to cause the vehicle to operate the thrusters 36 to move the vehicle 14 along the cleaning paths simultaneous with rotating the cleaning elements 34 to cause the cleaning elements 34 to brush against the hull 22. Operation of the vehicle 14 in this way is typically autonomous, whereby the vehicle 14 operates systems to continuously monitor its position relative to the vessel 24, and monitor operational status, and automatically adjust vehicle 14 operation to achieve optimal cleaning of the hull 22. In some embodiments, operation of the vehicle 14 may be manually overridden by a user remotely controlling the vehicle 14 by communicating with the processing unit 20 via the Internet.

When the vehicle 14 has moved along all of the cleaning paths, or the processing unit 20 otherwise determines the hull 22 is sufficiently cleaned, at stage 82, the processing unit 20 determines cleaning is complete and communicates with the deployment mechanism 18 to cause the mechanism 18 to operate to lift the vehicle 14 out of the water 12. In the illustrated embodiments, this involves the mechanism 18 operating the windlass 64 to decrease the effective length of the tether 16 until the vehicle is housed within the garage 28.

At stage 84, the processing unit 20 communicates with the vehicle 14 to download data recorded during deployment. Subsequently, when the processing unit 20 determines sufficient power and bandwidth is available, the processing unit

20 uploads the data to the remote server via the Internet. The data is typically stored in one or more data stores allowing a wide range of diagnostic and hull geometry data to be captured. Where multiple systems 10 are installed and operated, repeatedly, relative to various structures, this progressively increases the volume of data captured in the data stores. Analysis of this data therefore assists optimising operation of the system 10, including vehicle 14 navigation.

At stage 86, the processing unit 20 assesses one or more factors relating to the vessel 24 and/or a local environment to allow, at stage 88, the processing unit 20 to determine if the cycle period should be adjusted. The cycle period is a time period between a first cleaning schedule being started, at 70, and a second, subsequent cleaning schedule being initiated, at 70. For example, a default value is 24 hours to ensure the system 10 is operated on a daily basis to clean the hull 22. If the processing unit 20 determines 'yes', at stage 90, the cycle period timer is increased or decreased before starting the timer at stage 92. If the processing unit 20 determines 'no', the cycle period timer is started at stage 92.

In some embodiments, assessing the one or more factors, at stage 86, involves the processing unit 20 determining a location of the system 10. This involves operating the location module and/or communicating with a remote server via the Internet. Responsive to identifying a precise location of the system 10, the processing unit 20 is configured to communicate with a memory store, typically hosted on a remote server, to identify fouling growth rate information relating to the identified location. Responsive to identifying typical fouling growth rate at the location, the processing unit 20 is configured to increase or decrease the cycle period so that the vehicle 14 is deployed and operated to clean the vessel 24 sufficiently frequently to prevent fouling from being established on the hull 22.

In this embodiment, the processing unit 20 may also determine the date from the location module and/or the remote server and adjust the cycle period responsive to determining typical fouling growth rate at the location during the relevant period of the year, e.g. April.

In this embodiment, the processing unit 20 may be configured to receive data from a meteorological data feed and determine local forecast weather from the data feed, typically accessed via the Internet, and adjust the cycle period responsive to determining typical fouling growth rate at the location during the local climatic conditions, such as temperature, hours of sunlight, precipitation, prevailing currents, tide cycles, and the like.

In some embodiments, assessing the one or more factors, at stage 86, involves the processing unit 20 determining motion of the water 12 and/or the vessel 14. This involves assessing data collected by motion sensors, such as inertial measurement units (IMUs), arranged in the vehicle 14 and/or the garage 28. Responsive to assessing motion information captured by the motion sensors, the processing unit 20 is configured to determine local water turbulence 12 conditions, such as prevailing currents and wave height, and adjust the cycle period so that the vehicle 14 is deployed at appropriate times to avoid damage to the vehicle 14 and the vessel 24.

In some embodiments, assessing the one or more factors, at stage 86, involves the processing unit 20 determining a fouling condition of the vessel 14. This involves assessing data collected by sensors arranged in the vehicle 14, such as force sensors associated with the cleaning elements 34, or footage recorded by the cameras 48. Responsive to determining the fouling condition, the processing unit 20 is configured to adjust the cycle period so that the vehicle 14 cleans the hull 22 sufficiently frequently to prevent fouling being established.

In some embodiments, assessing the one or more factors, at stage 86, involves the processing unit 20 refining the definition of the geometry of the hull 22. This involves assessing data collected by the vehicle 14, such as footage recorded by the cameras 48, and/or consulting the memory store for relevant information from other cleaning operations. Responsive to refining the geometry of the hull 22, the processing unit 20 is configured to adjust the cycle period so that the vehicle 14 is operated sufficiently frequently to clean the entire surface area of the hull 22.

In some embodiments, assessing the one or more factors, at stage 86, involves the processing unit 20 comparing a current factor with a corresponding historical factor, for example, by referring to a data store accessed via the Internet, to determine a net difference. Responsive to determining a sufficient net difference, such as being greater than a threshold, the processing unit 20 is configured to adjust the cycle period to optimise cleaning frequency.

At stage 92, the cycle period timer is started. The cycle period timer defines a time period equivalent to the cycle period minus the duration of the previously executed cleaning schedule (or a default value when first operated). When the timer has elapsed, at stage 94, this causes the processing unit 20 to repeat the cleaning schedule by re-initiating the schedule, at 70.

It will be appreciated that operation of the system 10 may be varied to include more or less stages than the process described above. For example, in some embodiments, the system 10 may be specified as a basic model lacking the components necessary to perform the pre-deployment checks at stages 72 and 74. In this embodiment, the processing unit 20 is configured to directly progress from initiating the schedule, at stage 70, to causing the deployment mechanism 18 to operate to deploy the vehicle, at stage 76.

The system 10 is configured to automate cleaning of the structure according to the cyclical cleaning schedule. The system 10 automatically deploys, operates and recovers the vehicle 14 to clean the structure on a regular basis (upon expiration of each cycle period) to pro-actively remove fouling before it becomes established and potentially damages the structure. The system 10 is therefore a preventative fouling management system operated repeatedly and continuously to maintain fouling levels below an acceptable threshold.

In some embodiments, the system 10 automatically adjusts the cycle period of the cleaning schedule responsive to assessing one or more factors, such as location of the structure. This dynamic scheduling allows the system 10 to optimise frequency of cleaning operations to appropriately manage fouling for a specific structure, typically depending on environmental conditions. Where the structure is the vessel 24, this is advantageous, as local conditions significantly affect fouling growth. Furthermore, as vessels 24 change position due to being driven, the local conditions may change. The system 10 therefore allows continuous, dynamic updating of the cleaning schedule to optimise operation by monitoring local conditions.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A system for removing fouling from underwater structures of a non-static vessel carried on a body of water, the system comprising:

a vehicle operable to move through the water and clean the vessel, the vehicle having:

a body housing a plurality of thrusters operable to move the vehicle freely in three dimensional space through the water, and operable to move the vehicle against and along the vessel to clean the vessel, the thrusters positioned about the body to rotate the body about a pitch axis, roll axis, and yaw axis, and translate the body in a forward, reverse, and sideways directions;

a plurality of cleaning elements arranged at a top surface of the body, each cleaning element rotatable to clean the vessel;

a plurality of cameras operable to record video footage, the cameras carried by the body so that at least one camera is arranged at an operatively front surface of the body, and at least one camera is arranged at the top surface of the body to record footage of the vessel being cleaned by the cleaning elements; and first and second lighting elements carried by the body and associated with the cameras, the first lighting elements arranged to illuminate in front of the body and the second lighting elements arranged to illuminate above the body;

a tether connectable between the vehicle and a fixed position;

a deployment mechanism securable relative to the vessel and configured to move the vehicle into, and out of, the water; and a processing unit configured to communicate with each of the vehicle and the deployment mechanism, and to analyze video footage recorded by the cameras to control navigating the vehicle, and the processing unit further configured to execute a repeating cleaning schedule, the cleaning schedule defining a cycle period, wherein responsive to the cycle period elapsing, the processing unit executes the schedule to:

communicate with the deployment mechanism to cause the mechanism to operate to move the vehicle into the water;

communicate with the vehicle to cause the vehicle to operate the thrusters to move the vehicle through the water to be spaced from the structure, and operate the cameras to record video footage;

assess the video footage to determine geometry of the vessel, and, responsive to determining the geometry, determining a position of the vehicle relative to the vessel, and, based on the video footage recorded with the vehicle spaced from the structure and the determined geometry of the vessel, execute a mapping process to define cleaning paths to drive the vehicle along to clean the vessel;

communicate with the vehicle to operate the thrusters to autonomously move the vehicle along the cleaning paths simultaneously with rotating the cleaning elements to clean at least a portion of the vessel, whereby the vehicle continuously monitors its position relative to the vessel, based at least partially on the video footage, and adjusts its position to optimize cleaning of the vessel; and communicate with the deployment mechanism to cause the mechanism to operate to remove the vehicle from the water.

2. The system according to claim 1, wherein the processing unit is configured to adjust the cycle period responsive to assessing one or more factors relating to at least one of the vessel and an environment local to the vessel.

3. The system according to claim 2, wherein the processing unit is configured to compare the one or more factors with corresponding historical one or more factors, and wherein responsive to the processing unit determining a difference between the one or more factors and the historical one or more factors, the processing unit is configured to adjust the cycle period.

4. The system according to claim 2, wherein the processing unit is configured to adjust the cycle period responsive to determining a location of the vessel.

5. The system according to claim 4, wherein the processing unit is configured to adjust the cycle period responsive to determining at least one of a current date and time.

6. The system according to claim 4, wherein the processing unit is configured to receive a meteorological data feed, and wherein the processing unit is configured to adjust the cycle period responsive to assessing meteorological data relating to the location.

7. The system according to claim 2, further comprising one or more motion sensors arranged to detect motion of at least one of the water and the vessel, and wherein the processing unit is configured to communicate with the one or more motion sensors and adjust the cycle period responsive to receiving sensed motion information from the one or more motion sensors.

8. The system according to claim 2, wherein the vehicle includes one or more sensors configured to detect a fouling condition of the vessel, and wherein the processing unit is configured to adjust the cycle period responsive to receiving sensed fouling condition information from the vehicle.

9. The system according claim 2, wherein the processing unit is configured to adjust the cycle period responsive to determining a geometry of the vessel.

10. The system according to claim 9, wherein the vehicle includes one or more sensors configured to detect spatial information, and wherein determining the geometry includes assessing sensed spatial information.

11. The system according to claim 1, further comprising a garage configured to at least partially receive and enclose the vehicle, and wherein the deployment mechanism is operable to move the vehicle into, and out of, the garage.

12. The system according to claim 1, wherein the tether is fixed between the vehicle and the deployment mechanism, and wherein the deployment mechanism includes a windlass drivingly engaged with a motor such that operation of the motor adjusts an effective length of the tether.

13. The system according to claim 11, wherein the processing unit is housed within the garage.

* * * * *